UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

COMPOUND CONTAINING ACTIVE OXYGEN AND THE PROCESS OF MAKING THE SAME.

1,200,739.   Specification of Letters Patent.   Patented Oct. 10, 1916.

No Drawing.   Application filed December 24, 1913. Serial No. 808,533.

*To all whom it may concern:*

Be it known that I, OTTO LIEBKNECHT, a subject of the Emperor of Germany, residing at Frankfort-on-the-Main, Germany, have invented certain new and useful Improvements in Compounds Containing Active Oxygen and the Processes of Making the Same, of which the following is a full, clear, and exact specification.

This invention relates to new compounds containing active oxygen in the form of a persalt and a base other than an alkali, such as magnesium, and also to the process of making the same.

In U. S. Patent #816,925 and #842,470 heretofore issued to me, I have described the manufacture of magnesium perborate and sodium perborate respectively. In course of time it has been found that sodium perborate as well as magnesium perborate each have their own short-comings. It has furthermore been found, that the general properties of sodium perborate in various particulars make it the more desirable substance provided its stability can be increased without sacrificing any of its advantages.

In the researches on processes for manufacturing perborates I have found that I may produce a salt of desirable stability containing both sodium and magnesium for example and that I may vary the products in their composition according to the quantities of magnesium added to the charge; I have furthermore found that another important feature for the success of the process in furnishing very stable and well crystallized products is, to wit: the presence of an alkali-metal carbonate or alkali-metal bicarbonate during the reaction. I have not yet succeeded in positively establishing the exact constitution of the products thus obtained though I am inclined to believe that they very likely represent mixtures of sodium perborate and magnesium carbonate.

The advantages of my process are great and important inasmuch as it immediately turns out products having superior properties, the new salt especially possessing the great advantage over sodium perborate of being greatly resistant to the decomposing effect exerted by catalyzers. Solutions containing said new salts are mainly intended for use in bleaching establishments which very often employ copper vessels, the walls of which act as a catalyzer on substances containing active oxygen, but it has been found that the new salt obtained by the process described above is not affected by the copper and only very gradually splits off its oxygen. Furthermore the mother liquors in my process may easily be evaporated without sustaining any noticeable loss of active oxygen.

The process described above furnishes crystalline products which may be easily separated from the mother liquor, their physical properties facilitating their manufacture on a large scale in a most desirable way.

It is a further merit of the process described above that any process for the manufacture of sodium perborate may be made the basis of furnishing the new salt according to the modification suggested by the present invention.

To carry my invention into effect I may proceed in the following manner:

Example 1: 64 parts of sodium peroxid are added to about 900 parts of water, the solution being cooled during the addition to prevent any considerable rise in temperature. Then 80 parts of borax are added and afterward a solution of 84 parts of crystallized magnesium chlorid is permitted to flow in. Finally, the mixture thus obtained is treated with carbon dioxid gas, or dust-free waste gases containing carbon dioxid are passed into the mixture, until fifty cubic centimeters of a filtered sample discolors but five to ten cubic centimeters of a one fifth normal potassium permanganate solution after an addition of sulfuric acid. From the mixture a coarse crystalline product is obtained which may be separated in any of the well known ways from the mother liquor and then dried. The product thus obtained appears to be of a rather definite composition, inasmuch as the analysis of the products obtained from various charges always shows figures answering rather closely the following proportion:

$1Na_2O—1MgO—1B_2O_3—1CO_2—O_2—9H_2O.$

The further behavior of this product also seems to indicate that it is of the nature of a double salt.

Example 2: 65 parts of borax together with 120 parts of caustic soda are dissolved in 400–600 parts of water; 156 parts of a 13.5% solution of hydrogen peroxid are then introduced and a mixture of 20 parts of sodium bicarbonate and 24 parts of soda is added; 62 parts of a crystallized magnesium chlorid is then permitted to flow into the solution. The mixture is stirred for about one to two hours, care being taken that the temperature during the whole operation is suitably kept below 10° C. The obtained salt is then separated from the mother liquor by filtration. In this case also one obtains a sodium perborate containing magnesium, said compound containing nearly the theoretical amount of the active oxygen applied in the charge. The quantity of the added magnesium chlorid may be increased or reduced, one always obtaining crystalline substances which may be easily separated from the mother liquor and which represent a mixture of crystallized magnesium carbonate or sodium perborate with the double salt described above.

In these examples the magnesium chlorid may be added at any other stage of the process than that described. Other processes for the manufacture of sodium perborate may be resorted to within the spirit of this invention as a basis for the process described if care is taken that alkali-metal carbonates (acid or neutral) are present, or are added or formed during the process, besides the substances necessary for the production of sodium perborate. Furthermore, one may replace the magnesium chlorid by magnesium sulfate and even insoluble compounds like magnesium hydroxid, magnesium peroxid, or magnesium carbonate in either amorphous or crystallized form, the formation of the double salt in these cases, however, requiring more time.

Example 3: 468 parts of sodium peroxid are introduced into a solution of 680 parts of borax in 5000 parts of water, whereupon carbon dioxid is admitted until fifty cubic centimeters of a filtered sample shows the test described under Example 1. The precipitate thus obtained is separated from the lye by filtration and while it still contains more or less moisture it is soaked with a solution of 50 parts of $MgCl_2 + 6H_2O$ in 300 parts of water. After the magnesium chlorid solution has been allowed to act on the precipitate for some time, said solution is drawn off by vacuum and the product remaining on the filter is directly dried without being washed. The mother liquor obtained by this latter operation may be collected separately and may be returned to the process or may be used for other purposes. The magnesium chlorid solution referred to may of course be replaced by the other magnesium compounds described, the concentration of such solutions being of secondary importance.

The mother liquor resulting in any of the above examples may be readily evaporated in vacuo inasmuch as it contains the stable compounds obtained by the process described above.

The products described above are easily obtained if attention is paid to the fact that besides the sodium perborate, alkali-metal carbonate or alkali-metal bicarbonate respectively is formed during the reaction and if one therefore starts from charges which do not cause the formation of such alkali-metal carbonate or alkali-metal bicarbonate, either of these salts must be added or must be generated in some way within the reaction mixture.

It is of course understood that the above process may be changed without departing from the spirit of the invention inasmuch as it holds good also of the known alkali perborates in general and as the magnesium compounds mentioned above may finally be substituted altogether by compounds the basic metal of which is not an alkali metal and is capable of forming perborate salts, as well as carbonates, as for instance by the compounds of the alkali-earth metals, zinc compounds, etc., such variations are claimed to come within the scope of the invention.

What I claim and desire to secure by Letters Patent is:

1. The process of manufacturing a stable compound comprising an alkali-metal perborate consisting in combining the said alkali-metal perborate with the carbonate of a basic metal other than an alkali-metal.

2. The process of manufacturing a stable compound comprising an alkali-metal perborate consisting in providing an alkali-metal carbonate in a mixture yielding an alkali metal perborate and acting on the mixture with a soluble compound of a basic metal other than an alkali metal, said basic metal being able to form a carbonate.

3. The process of manufacturing a stable compound comprising an alkali-metal perborate consisting in generating an alkali-metal carbonate in a mixture yielding an alkali-metal perborate and then reacting on the mixture with a soluble compound of a basic metal other than an alkali metal, said basic metal being able to form a carbonate.

4. The process of manufacturing a stable compound comprising sodium perborate consisting in combining sodium perborate with the carbonate of an alkali-earth metal.

5. The process of manufacturing a stable compound comprising sodium perborate consisting in reacting on a mixture yielding sodium perborate with a soluble compound of a basic metal other than an alkali metal, said basic metal being able to form a carbonate.

6. The process of manufacturing a stable compound comprising a sodium perborate consisting in providing an alkali-metal carbonate in a mixture yielding sodium perborate and acting on the mixture with a suitable compound of a basic metal, said basic metal being able to form a carbonate.

7. The process of manufacturing a stable compound comprising sodium perborate consisting in generating an alkali-metal carbonate in a mixture yielding an alkali-metal perborate and reacting on the mixture with a suitable compound of an alkali-earth metal.

8. The process of manufacturing a stable compound comprising sodium perborate consisting in combining sodium perborate with magnesium carbonate.

9. The process of manufacturing a stable compound comprising sodium perborate consisting in reacting on a mixture yielding sodium perborate with a soluble magnesium compound in the presence of a sodium carbonate.

10. The process of manufacturing a stable compound comprising sodium perborate consisting in generating a sodium carbonate in a mixture yielding sodium perborate and reacting on the mixture with a soluble magnesium compound.

11. The process of manufacturing a stable compound comprising sodium perborate consisting in generating a neutral sodium carbonate in a mixture yielding sodium perborate and reacting on the mixture with a soluble magnesium compound.

12. As a new product, a stable alkali-metal perborate containing carbon dioxid and a basic metal other than an alkali metal, said basic metal being able to form a carbonate.

13. As a new product, a stable sodium perborate containing carbon dioxid and an alkali-earth metal.

14. As a new product, a stable sodium perborate containing carbon dioxid and magnesium.

15. As a new product, a stable sodium perborate containing carbon dioxid and magnesium in the proportion $$1Na_2O - 1MgO - 1B_2O_3 - 1CO_2 - O_2 - 9H_2O.$$

In testimony whereof I have signed this specification in the presence of two subscribing witnesses.

OTTO LIEBKNECHT.

Witnesses:
JEAN GRUND,
CARL GRUND.

Copies of this patent may be obtained for five cents each, by addressing the "Commissioner of Patents, Washington, D. C."